Feb. 23, 1954

H. W. RAHN 2,670,269

SODIUM CARBONATE

Filed July 13, 1950

3 Sheets-Sheet 1

Inventor

HENRY W. RAHN.

Olen E. Bee

Attorney

Figure 2:
Figure 3:

Figs. 2 and 3-Normal dense soda ash produced according to existing practice. Fig. 2, unscreened; Fig. 3, screened.

Figure 5:
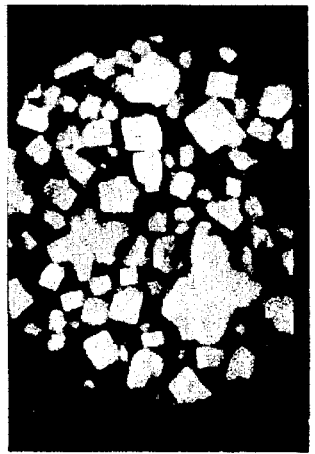
Figure 6:
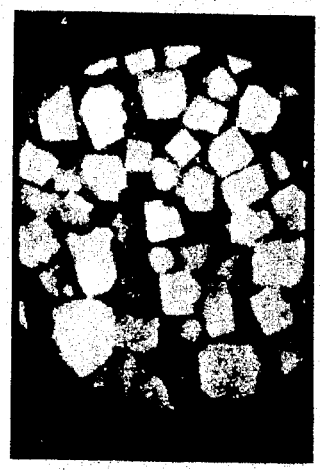

Figs. 5 and 6-Modified dense soda ash produced according to this invention. Fig. 5, unscreened; Fig. 6, screened.

INVENTOR.
HENRY W. RAHN
BY
ATTORNEY

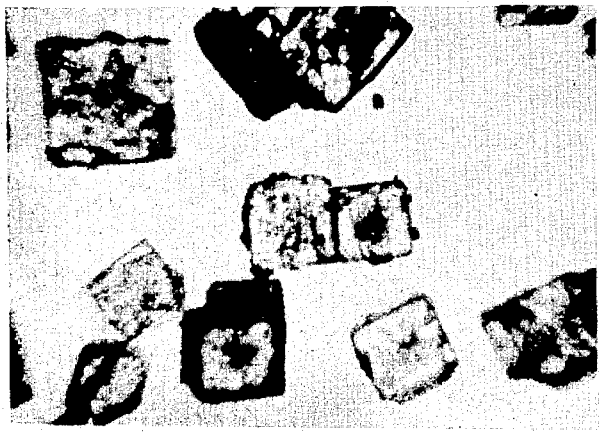

Fig. 7-Modified sodium carbonate monohydrate produced according to this invention and similar to that from which the dense soda ash of modified crystal style of Figs. 5 and 6 is made.

Fig. 4- Normal sodium carbonate monohydrate produced according to existing practice and similar to that from which the normal dense soda ash of Figs. 2 and 3 is made.

INVENTOR.
HENRY W. RAHN
BY Olen E. Bee
ATTORNEY

Patented Feb. 23, 1954

2,670,269

UNITED STATES PATENT OFFICE 2,670,269

SODIUM CARBONATE

Henry W. Rahn, Corpus Christi, Tex., assignor to Columbia-Southern Chemical Corporation, a corporation of Delaware Application July 13, 1950, Serial No. 173,520

11 Claims. (Cl. 23—63)

This application is a continuation-in-part of my co-pending application, Serial No. 760,131, filed July 10, 1947, now abandoned.

This invention relates to sodium carbonate and its manufacture, and more particularly to the manufacture of sodium carbonate monohydrate in novel crystalline form, and the dehydration of such monohydrate to obtain a novel granular dense soda ash.

The so-called "light ash" of commerce has a relatively low bulk or apparent density. That is to say, when loosely packed it has a low weight per unit volume, usually ranging about 30 to 35 pounds per cubic foot. In handling, it is fluffy and dusts badly.

To meet the needs of industry for a soda ash of higher bulk density and less dustiness, there have heretofore been manufactured different varieties of so-called "dense ash." Of these varieties, perhaps most is now produced by the hydration of light ash with controlled amounts of water to form the crystalline monohydrate which is then dehydrated. The resultant ash is of higher bulk density, normally ranging from 58 to 65 pounds per cubic foot, but the particles are of widely varying shapes and dimensions and this product likewise dusts objectionably on handling.

Another prior art approach was to heat light ash to the point of fusion and then break up the resultant fused or sintered anhydrous soda ash to discrete small particles by grinding. The process is uneconomical and has been largely abandoned.

A third approach heretofore proposed involves the decomposition of a slurry of sodium bicarbonate with steam to form a solution of sodium carbonate containing some bicarbonate. To this solution is added a saturated solution of sodium carbonate containing brine, and the mixture is heated to precipitate anhydrous sodium carbonate, the mother liquor being separated and recycled to pick up more sodium carbonate. This process is costly and complicated.

An object of the present invention is to provide an improved dense soda ash of compact granular form and improved dusting characteristics on handling.

A further object of the invention is to provide bulk sodium carbonate monohydrate in improved crystalline form characterized by more compact configuration and uniform size of the individual particles than heretofore obtainable.

An additional object of the invention is the provision of a novel, economical and improved process of hydrating light ash to convert it to sodium carbonate monohydrate crystals of new and improved characteristics.

Still another object is to provide a method of modifying crystalline sodium carbonate monohydrate to supply it in desired crystalline form, either by reducing the number of twinned crystals formed, by accentuating its normal habit, or by altering its style; which method is simple, efficient and inexpensive, does not interfere with existing practice, and requires no modification of standard equipment.

The achievement of these and other objects of the invention will become apparent upon consideration of the following description of the invention.

Figure 1:
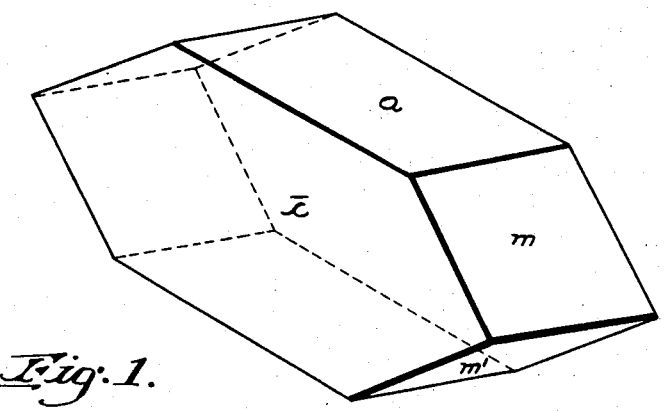

The invention will be described with reference to the accompanying drawings in which Fig. 1 is an oblique view of an ideal sodium carbonate monohydrate crystal; Fig. 2 a photomicrograph of crystals of dense ash produced in accordance with existing commercial practice; Fig. 3 a photomicrograph of the dense ash of Fig. 2 after screening to 30–80 mesh; Fig. 4 a photomicrograph of monohydrate similar to that from which dense ash of Figs. 2 and 3 is made, at a higher magnification; Figs. 5 and 6 photomicrographs similar to Figs. 2 and 3, illustrating dense ash of modified crystal style produced in accordance with one, and the preferred, embodiment of this invention; Fig. 7 a photomicrograph at higher magnification of modified crystal style monohydrate in accordance with this invention; and Fig. 8 a schematic view illustrative of crystal growth.

As indicated above, dense soda ash is commonly made today by dehydration of sodium carbonate monohydrate produced by hydration of light ash. For example, light ash taken from the bicarbonate calciner at a temperature of about 160° to 200° C. is mixed in an agitator with an excess of water over that necessary to form the monohydrate, say a total of 20 to 40 percent by weight based on the light ash, the water being at a temperature of 50° to 90° C. There is first formed an amorphous mass which, on continued agitation at a temperature below the transition temperature of monohydrate to anhydrous sodium carbonate, develops into a mass of crystals of sodium carbonate monohydrate. The size of the crystals formed depends, inter alia, on the temperature and rate of cooling of the mix during formation of the monohydrate crystals. In usual practice, the mix is allowed to crystallize at 90° to 107° C.

Crystals of monohydrate formed by the process outlined are predominantly elongated bipyramidal orthorhombs, i. e., the crystals consist of two geometrical prisms or pyramids whose bases are parallel and are separated by a rectangular hexahedron. The ideal appearance of such a crystal, greatly magnified, is depicted in Fig. 1.

It will be understood that the actual crystals of the monohydrate, as visible to the eye, comprise a large number of the unit crystals. Study has shown that, in normal crystallization of sodium carbonate monohydrate as described above, these relatively large crystals are orthorhombs which have the general contours resembling the unit crystal illustrated in Fig. 1. The great preponderance of such crystals are more than two and one-half times as long (measured in a direction parallel to the major or longitudinal axis of the crystal) as their next longest dimension (measured along a crystal axis at right angles to the major axis). These crystals may be quite thin, i. e., the third dimension being appreciably smaller than the second or next longest dimension in some cases, but frequently the third dimension is substantially the same or only 5 to 20 percent shorter than the second or next longest dimension.

According to this invention, I have discovered that regularity in crystal formation can be promoted, twinning of crystals reduced, and the contour of the resulting crystals modified by conducting the hydration of sodium carbonate (light ash) to monohydrate in the presence of organosulfates and organosulfonates and their water-soluble salts. Upon dehydration of such crystals, the product consistently is more dust-free and normally has a greater bulk density than dense ash produced in the conventional way.

I have found that many of the monohydrate crystals produced according to the preferred embodiments of this invention are orthorhombs of modified external shape in which the longest dimension of the crystal, measured in a direction parallel to the major or longitudinal axis of the crystal, is not more than two times the next longest dimension, measured along a crystal axis at right angles to the longitudinal axis. Such crystals may be relatively flat, in which case the third dimension is measured along an axis at right angles to the longitudinal axis, and the second axis mentioned above may be substantially shorter than the above mentioned next longest dimension. Frequently, however, the preponderance of the crystals possess appreciable thickness; the thickness thereof being only about 5 to 20 percent less than the next longest dimension.

These modified crystals exhibit the normal habit, i. e., the crystal angles of the unit crystals are identical with those of thermonitrite (sodium carbonate monohydrate) as illustrated in Fig. 1. However, the composite crystal, comprising a large number of unit crystals, is foreshortened as compared with the crystal of Fig. 1. This foreshortening is due to the manner of crystal growth which has resulted in more rapid growth of certain crystal faces than others.

I have discovered further that when the monohydrate crystals which are foreshortened as produced, as heretofore described, are dehydrated, the bulk density of the resulting sodium carbonate is appreciably above that of normal dense ash. Moreover, monohydrate crystals produced using the above modifying agents, even if not foreshortened as heretofore described, consistently produce dense ash, upon dehydration, which is more dust-free than normal dense ash. The dense ash crystals thus produced have the shape of the monohydrate crystals from which they are produced.

The agents which have been found to be effective modifiers for modifying the contour of the resulting crystal are organosulfates or organosulfonates, many of which have the general formula $HO-SO_2-OR$; R being an organic radical, containing at least 6 carbon atoms, which is linked to the sulfate or sulfonate group through carbon, and the water-soluble salts thereof. Such salts include the alkali metal (including ammonium) salts. These materials are frequently used in the detergent field as wetting and surface tension reducing agents.

Agents which produce best results are those in which the organic group linked to the sulfate or sulfonate group is hydrocarbon. Such compounds include benzene sulfonic acid, naphthalene sulfonic acid and alkylaryl or aralkyl sulfonic and sulfuric acids and their salts, such as sodium para-xylene sulfonate, sodium para-toluene sulfonate, isopropyl naphthalene sodium sulfonate, the compound

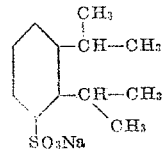

and its corresponding diethyl, dimethyl and dipropyl salts, and like alkyl naphthylene and alkyl benzene derivatives in which the alkyl group or groups contain up to 18 carbon atoms. Other contemplated compounds include the sulfonic acids of kerosene or like petroleum hydrocarbon and their salts, as well as the alkali metal and like salts of sulfated fatty alcohols containing 8 to 18 carbon atoms, particularly normal primary or secondary aliphatic alcohols, for example, sodium octyl sulfate, sodium lauryl sulfate, sodium cetyl sulfate, and the corresponding ammonium and alkylol amine salts. Also included are the aralkyl sulfonic acids, such as sodium or other salt of benzyl sulfonic acid, phenyl propyl sulphuric acid, etc.

Other sulfates and sulfonates which are useful for modification of the crystal shape and/or reduction of twinning and promotion of regularity in crystal formation include dioctyl sodium sulfosuccinate and other corresponding aliphatic monohydric alcohol esters such as the corresponding diisobutyl, diamyl, dihexyl esters, naphthol-sulfonic acids, and naphthylamine sulfonic acids and their salts, Turkey-red oil, etc. Although these agents are of the anionic class, cationic agents may be used also.

The foregoing agents in general are characterized as being surface active agents because they exhibit wetting, detergent or emulsifying properties that flow from a modification of conditions or characteristics existing at the interface between two phases. Wetting action is beneficial in production of sodium carbonate monohydrate in that the light ash is thereby more rapidly and uniformly wetted with a resultant appreciable rise in the temperature of the water-ash mass, which is conducive to the formation of larger crystals. However, consideration shows that wetting action alone is not responsible for the modification of crystal style or emphasis of crystal form that characterizes this invention.

Thus, if one of these agents, such as sodium p-xylene sulfonate, merely promoted growth of a monohydrate crystal uniformly, there would be no alteration of the shape of the crystal during its growth. On the other hand, the fact that in the practice of my invention certain faces of the crystal are emphasized, and other faces obscured or even caused to disappear, shows that in the presence of these modifying agents the normal relative velocity relations of face growth are altered. Consequently, I now believe that crystal modification in accordance with this invention is due to the following phenomena.

The modifying agents, being surface active, are not only adsorbed at the surfaces of the carbonate crystal, but those agents that are operative for the purposes of this invention are adsorbed more strongly at certain faces than at others, in consequence of forces varying along the different crystallographic planes. Because of this preferential adsorption whereby the modifying agent is displaced more readily from certain faces than from others, the growth relations that normally prevail are altered, with consequent modification of the resultant crystals. In other words, for the crystal to grow, the adsorbed film of modifying agent must be displaced, and where, due to forces varying according to the crystallographic planes represented by the crystal faces, it is displaced readily from some faces and less readily from others, the former faces will grow at a linear velocity greater than that of the latter. In consequence, the faces that grow at the higher linear velocity or velocities will tend to become obscured, while those growing at lower linear velocities become emphasized. Thus, although the crystal habit remains unaltered, crystal modification results, either in style or in emphasis of form.

Figure 8:
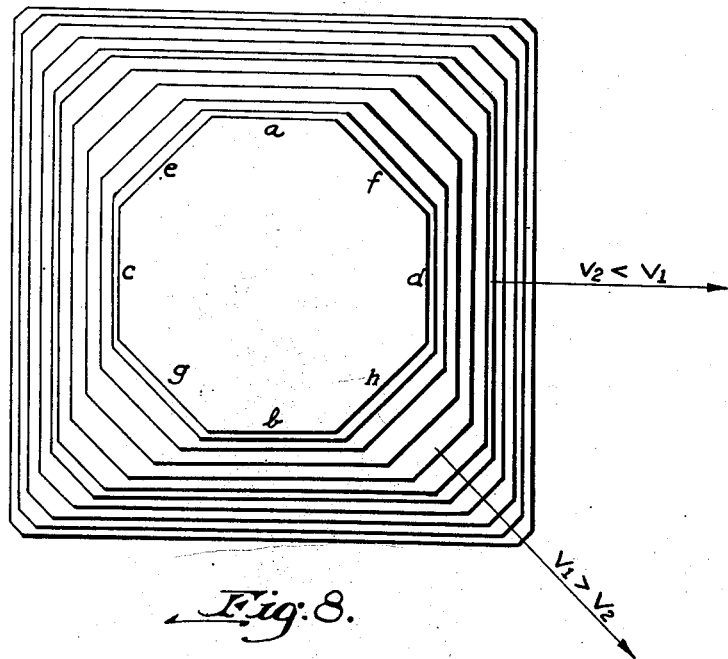

This may be explained further with reference to Fig. 8 in which the innermost octagon represents a cross-section of a crystal nucleus. Let a surface active agent be adsorbed upon the faces so that it is displaced less readily from faces $a$, $b$, $c$ and $d$ than from faces $e$, $f$, $g$ and $h$. Then crystallization will proceed at faces $e$, $f$, $g$ and $h$ at a linear velocity $v_1$ that is greater than the velocity $v_2$ at faces $a$, $b$, $c$ and $d$. Fig. 8 then shows that as crystallization proceeds, as indicated by the succession of octagons, faces $e$, $f$, $g$ and $h$ become progressively obscured and may even disappear, while faces $a$, $b$, $c$ and $d$ are concomitantly emphasized. This explains, I now believe, what occurs in the practice of this invention.

With the modifying agents I have investigated, I find that the concentration in which they prove effective in obtaining the desired result is susceptible of considerable variation. Ordinarily, less than 0.05 percent by weight of the alkali metal organosulfate or sulfonate, based on the amount of water added to the light ash, will not produce enough effect in modifying the crystal style of the monohydrate to warrant the use of such low concentration. Usually, the most effective concentration for the modifying agent lies between 0.05 and 0.30 percent by weight of the water added to the light ash. For example, using diisopropyl benzene sodium sulfonate, I find that it is advantageous to add it to the water going into the "mix" in concentration of about 0.125 percent by weight of the water. Lesser amounts produce less compact crystals and larger amounts do not improve the results sufficiently to satisfy economy.

The precise amount needed will vary, however, according to the particular agent. Probably enough must be used to form a monomolecular film over the interface between the crystals and the water used for hydration. Since these agents are heteropolar and orient themselves normal to the interface, the amount necessary to provide such a film will depend upon the diameter or geometrical size of the modifying agent molecule. Because these agents vary widely in composition and consequently in their spatial characteristics, it is thus not possible to specify operative numerical limits applicable to all of them and, as indicated above, the upper limit is not critical but rather is dictated by such considerations as operating economy and the need for avoiding contamination of the product by excessive amounts of the agent.

The invention will be understood further from the following examples which afford a basis of comparison of dense ash made without modifying agents in the water, with dense ash produced by the practice of the invention:

*Example I*

The equipment employed consists of a horizontally disposed cylindrical rotary mixer about six feet in diameter and eight feet long. Temperature control is provided by means for passing air in controlled amount through the mixer. At the inlet of the mixer, suitable means are provided for the controlled introduction of water and simultaneous controlled introduction of light ash. The contents of the mixer are continuously discharged to a conventional rotary dryer.

In one operation, light ash at a temperature between 184° and 188° C. was introduced at a rate of between 158 and 175 pounds per minute into the mixer where it was mixed with water at a temperature between 50° and 55° C. introduced at a rate of 45 pounds per minute. The mixer was rotated at a speed of 7 revolutions per minute and the mix temperature at the outlet averaged about 92° C. An average of slightly less than 5 tons per hour of dense ash was obtained from the dense ash dryer at a temperature averaging about 164° C.

With no modifying agent incorporated in the water going to the mixer, the bulk density of the dense ash obtained over a period of 2 hours averaged 61 pounds per cubic foot.

Incorporation of 0.12 percent by weight of 2,3-diisopropyl benzene sodium sulfonate in the water going to the mixer resulted in an increase in bulk density of the dense ash product to an average of 66.1 pounds per cubic foot. The temperature of the mix at the outlet was 95° C. The other conditions were not varied.

In each instance, approximately 50 percent of the product passed a 30-mesh screen, but was retained on 80-mesh screen. However, the product obtained when the modifying agent was employed according to the invention was far superior in freedom from dust in handling. The particles were less friable. Examination of the two products under the microscope proved that the particles of dense ash produced with the aid of the modifying agent incorporated in the mix water were more uniform and more compact than those of the other product.

*Example II*

The apparatus employed is that described above in Example I. In the following operation, the rate of production was increased by increasing the rates of charging light ash and water 26.4 percent over the rates specified in Example I. The light ash charged varied in temperature between 184° and 190° C., the water between 58° and 60° C., and the mix temperature at the outlet averaged about 94° C. The mixer was rotated at a speed of 9.5 revolutions per minute. Dense ash left the dryer at between 163° and 170° C. With no modifying agent in the water going to the mix, the dense ash product averaged 62.0 pounds per cubic foot in bulk density, loosely packed.

Incorporation in the water going to the mixer of 0.064 percent by weight of 2,3-diisopropyl benzene sodium sulfonate (based on the water) increased the bulk density of the product to about 64.5. When the concentration of this sulfonate in the water was increased to 0.27 percent by weight, the bulk density of the product increased to 67.5 pounds per cubic foot.

Figs. 2 and 3 illustrate, respectively, photomicrographs of unscreened and screened samples of dense ash produced in the operation first described in this example. The screened sample was passed through a 30-mesh screen and retained on 80-mesh. It will be observed that the crystals are of irregular shape and size, and that a substantial proportion of interpenetrating twins are present. Such twins are friable and account in part for the dusting that occurs in the handling of such material. From Fig. 3 it may be seen particularly that this product is characterized by bipyramidal orthorhombic crystals, as that term is defined above.

Figs. 5 and 6 show, respectively, the appearance of comparable unscreened and screened samples obtained during the operation described above, with 0.27 percent of this sulfonate incorporated in the water going to the mixer. The particles shown are typical of the product obtained in the practice of the invention. These crystals are predominantly rectangular parallelopipeds and, as seen under the microscope, they appear to be essentially cubical. They are of more uniform size than dense ash produced without crystal modification (compare Figs. 3 and 6), and twins are substantially absent. These more compact crystals are less susceptible to disintegration than those of Fig. 3, and the product is less dusting.

Example III

To further illustrate the advantageous modification of the crystal style of sodium carbonate monohydrate by the incorporation of the modifying agents of the invention, there was prepared 500 mls. of distilled water containing about 0.20 percent by weight of sodium para-xylene sulfonate. This was saturated with anhydrous sodium carbonate at 38° C. with continuous vigorous stirring. The preparation was then filtered and the filtrate placed in a bath, the temperature of which was slowly raised from 38° to 90° C. over a three-day period. At the end of this period the crystals were removed from the mother liquor, dried and examined; the dimensions were measured and it was found that the crystals were orthorhombs of modified style characterized by being essentially rectangular parallelopipeds, the longest dimension, measured parallel to the crystal axis, of which was not more than two times the next longest dimension at right angles thereto. Through the microscope they appeared practically cubical in shape.

For purposes of comparison, precisely the same procedure was followed excepting that sodium para-xylene sulfonate was not incorporated in the distilled water. The crystals thus obtained without modifying agents consisted of elongated orthorhombs wherein two triangular prisms are separated by a rectangular hexahedron. In the absence of modifiers the crystals exhibited much twinning and many irregular forms, just as in the case of the dense ash shown in Figs. 2 and 3. This is undesirable from the point of view of the objectives of this invention. Likewise, the crystals were much longer in comparison to either width or breadth than the crystals produced with sodium para-xylene sulfonate as a modifier.

Figs. 4 and 7 are photomicrographs of monohydrate produced in pilot plant operation without modifying agent (Fig 4), and with the sodium p-xylene sulfonate of Example III (Fig. 7). Here again Fig. 4 illustrates the normal characteristic of monohydrate (compare with Figs. 2–3), while Fig. 7 illustrates the change of style of this invention (compare with Figs. 5 and 6). It will be observed also that the crystal form of the monohydrate determines that of dense ash made by dehydration of it.

While the concentration of the modifying agent, temperature of hydration of the ash, rate of production and degree of agitation all exert more or less influence on the size of the individual particles, and the various modifying agents above identified vary somewhat in the degree of compactness of the monohydrate crystals produced, yet the bulk sodium carbonate monohydrate of the invention can be distinguished from prior art masses of crystals in that a substantial majority of the individual crystals are orthorhombs of modified style characterized in being essentially rectangular parallelopipeds, the longest dimension of which is not more than two times the next longest dimension, as previously described. The preferred modifying agents, such as diisopropyl benzene sodium sulfonate and sodium para-xylene sulfonate, will produce essentially cubical crystals when employed according to the teachings of the invention. Actually, the ratio of the three dimensions of the preferred form of crystal are not exactly 1:1:1, but they are at least near enough to be cubical in shape to give such an impression to the eye when viewed under the microscope. Examination of samples of monohydrate crystal leaving the mixer in comparison with particles of dense ash obtained therefrom has shown that the shape of the monohydrate crystal is retained in the dense ash.

In the foregoing specification and in the appended claims, the term "light ash" means anhydrous soda ash having an apparent or bulk density between 31 and 40 pounds per cubic foot, when loosely packed. Such ash is usually obtained by calcination of precipitated sodium bicarbonate obtained in the ammonia-soda process. The term "alkali metal salt" is meant to include ammonium salts. The terms "essentially rectangular parallelopipeds" and "essentially cubical in shape" refer to the general configuration and appearance of individual crystals and not to perfect geometrical forms. That slight imperfections or surface irregularities are present is made obvious by examination of the drawings, but the shapes referred to are so much in evidence as to predominate the character of the crystals.

According to the provisions of the patent statutes, I have explained the principle of my invention and have illustrated and described what I now consider to represent its best embodiment. However, I desire to have it understood that, within the scope of the appended claims, the in-

I claim:

1. A method of manufacturing sodium carbonate monohydrate by hydration of sodium carbonate which comprises conducting the hydration in the presence of an agent selected from the class consisting of organosulfates, organosulfonates, and their water soluble salts.

2. The process of claim 1 wherein the organo radical of the agent is a hydrocarbon group.

3. The process of claim 1 wherein the agent is an alkyl aryl sulfonate.

4. The process of claim 1 wherein the agent is an alkyl naphthalene sulfonate.

5. The process of claim 1, wherein the modifying agent is an alkyl benzene sodium sulfonate.

6. The process of claim 1, wherein the modifying agent is an alkyl aryl sodium sulfonate.

7. In the manufacture of dense soda ash by hydration of light soda ash to the monohydrate and dehydration of the monohydrate, the improvement which comprises conducting the hydration in the presence of an alkali metal salt of an acid sulfate of a normal primary aliphatic alcohol containing 8 to 18 carbon atoms.

8. The process of claim 7 wherein the sulfate is sodium lauryl sulfate.

9. A method of manufacturing bulk sodium carbonate monohydrate which comprises mixing light ash with sufficient water to convert it to crystalline sodium carbonate monohydrate, and with at least one crystal-modifying agent selected from the class of surface active agents consisting of organo metal sulfates, organosulfonates, and their water soluble alkali metal salts, and continuously agitating the mixture while maintaining the temperature thereof in the range between 90° and 107° C. until substantially complete conversion into crystalline sodium carbonate monohydrate has taken place.

10. A method of manufacturing dense soda ash which comprises mixing light ash at a temperature between 160° and 200° C. with water at a temperature between 50° and 90° C., the ratio of light ash to water being approximately 10:3 in parts by weight, and said water having incorporated therein between 0.05 and 0.30 percent by weight of at least one crystal-modifying agent selected from the class consisting of organosulfonates, organosulfates, and their water soluble alkali metal salts, continuously agitating the mixture while maintaining the temperature thereof in the range between 90° and 107° C. until substantially complete conversion into crystalline sodium carbonate monohydrate has taken place, and then dehydrating said crystalline monohydrate so as to obtain dense soda ash conforming in individual particle size and shape with the individual crystals of the monohydrate from which obtained.

11. In the manufacture of dense soda ash by hydration of light soda ash to the monohydrate and dehydration of the monohydrate, the improvement which comprises conducting the hydration in the presence of an alkali metal para xylene sulfonate.

HENRY W. RAHN.

References Cited in the file of this patent

UNITED STATES PATENTS

| Number | Name | Date |
|---|---|---|
| 1,907,987 | Lynn | May 9, 1933 |
| 1,921,505 | Chesny | Aug. 8, 1933 |
| 2,133,455 | Keene et al. | Oct. 18, 1938 |

FOREIGN PATENTS

| Number | Country | Date |
|---|---|---|
| 136,841 | Great Britain | Feb. 17, 1921 |

OTHER REFERENCES

Mellor's, "A Comprehensive Treatise on Inorganic and Theoretical Chemistry," vol. 2, pages 751, 752. Longmans, Green and Co., N. Y.

Webster's "New International Dictionary," 1939 Ed., page 639.

McPherson and Henderson "General Chemistry," page 199, 3rd Ed. Ginn and Co., N. Y.